Feb. 15, 1966 L. G. OLIARI ETAL 3,235,714

INFORMATION HANDLING APPARATUS

Filed July 24, 1961 4 Sheets-Sheet 1

INVENTOR.
LOUIS G. OLIARI
RICHARD D. PASCIUTO
BY
ATTORNEY

INVENTOR.
LOUIS G. OLIARI
RICHARD D. PASCIUTO
BY
Henry L. Hanson
ATTORNEY

INVENTOR.
LOUIS G. OLIARI
RICHARD D. PASCIUTO
BY
Henry L. Hanson
ATTORNEY

Feb. 15, 1966 L. G. OLIARI ETAL 3,235,714

INFORMATION HANDLING APPARATUS

Filed July 24, 1961 4 Sheets-Sheet 4

INVENTOR.
LOUIS G. OLIARI
RICHARD D. PASCIUTO
BY
Henry L. Hanson
ATTORNEY

United States Patent Office 3,235,714
Patented Feb. 15, 1966

3,235,714

INFORMATION HANDLING APPARATUS

Louis G. Oliari, Brockton, and Richard D. Pasciuto, Randolph, Mass., assignors to Honeywell Inc., a corporation of Delaware Filed July 24, 1961, Ser. No. 126,070
7 Claims. (Cl. 235—61.11)

A general object of the present invention is to provide a new and improved apparatus for converting digital data in one type of code into a second type of code. More specifically, the present invention is concerned with a new and improved apparatus for converting a Hollerith-type code into a binary code wherein the converting apparatus is characterized by its simplicity and speed of operation while providing an extremely accurate and reliable conversion.

Digital data which is encoded in documents is frequently encoded in a form generally referred to as the Hollerith-type code. The Hollerith code has been considered suitable for documents principally because it is possible to encode accurately a substantial amount of data in the form of a series of marks or holes arranged on a card which may be conveniently handled in a document reader. The Hollerith code in its most typical form is arranged in a series of rows and columns. The rows may be identified by the decimal numbers 0 through 9 and the characters X and R. The rows are generally arranged across the lateral dimension of a punched card or similar document. The number of columns which extend along the length of the card will, of course, depend upon the card length. However, a typical number of columns for a punched card is 80. While the Hollerith-type code may be effectively used in encoding digital data on a document, the use of the Hollerith code in high-speed digital data processing systems is not practical for the reason that the encoding of a single number or character requires the presence of ten or twelve digital spaces, depending upon whether or not the information is numeric or alpha-numeric. In order to make effective use of data processing systems and to minimize the number of individual signals that must be used to represent any particular number or character, it is known that alpha-numeric information may be encoded in binary form. When so encoded, the resultant code will require only six separate individual digital signals for representing the alpha-numeric information generally encountered.

The present invention is more particularly concerned with the provision of new and improved apparatus for converting data representations in the Hollerith code into binary coded alpha-numeric information wherein the conversion process takes place directly as the Hollerith code is being read from an incoming document. One method of converting Hollerith encoded data from a document heretofore known has comprised the reading of the individual character-identifying bits in the Hollerith-type code and storing within the conversion equipment an image of the code after which an examination can be made to effect the desired conversion. This arrangement is both time-consuming and expensive for the reason that special storage must be provided for the Hollerith-type code as well as the code after it has been converted. This arrangement also involves separate processing steps for the reading of the card as well as the steps involved in the conversion.

As taught by the present invention, the data conversion with respect to any Hollerith code is effected simultaneously with the reading of the data from an input document. This eliminates the need for any special storage for the Hollerith code. This is accomplished by utilizing a special circuit configuration wherein the encoded data may be stored on a predetermined addressable basis which is related to the individual columns associated with the Hollerith code. In the event that a Hollerith identification is detected in any particular row, at a predetermined column location, an appropriate binary code is generated and inserted in storage to uniquely represent the identification sensed on the input. Inasmuch as there may be more than one code identification located in any particular column, special provision has been made in accordance with the teachings of the invention to superimpose or combine the binary data associated with each identification sensed in each column so that the end result which is stored in the special storage location related to the column will be combined binary representation of all of the Hollerith data sensed in a particular column.

A further object of the invention is therefore to provide a new and improved apparatus for converting a Hollerith code into a binary code wherein each Hollerith identification is associated with a predetermined storage location wherein binary data may be stored representing each Hollerith identification sensed.

Still another more specific object of the present invention is to provide a new and improved conversion apparatus wherein a document-bearing Hollerith code may be examined so that, during the course of the examination of each Hollerith identification, a binary conversion may be effected relative to identifications sensed and uniquely stored in selectively addressable storage locations in associated circuitry.

A still further object of the present invention is to provide a new and improved apparatus in accordance with the foregoing objects wherein the principles thereof are also applied to the generation of checking data, such as parity bits, which may be carried along with the information after it has been converted to binary form.

The foregoing objects and feature of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
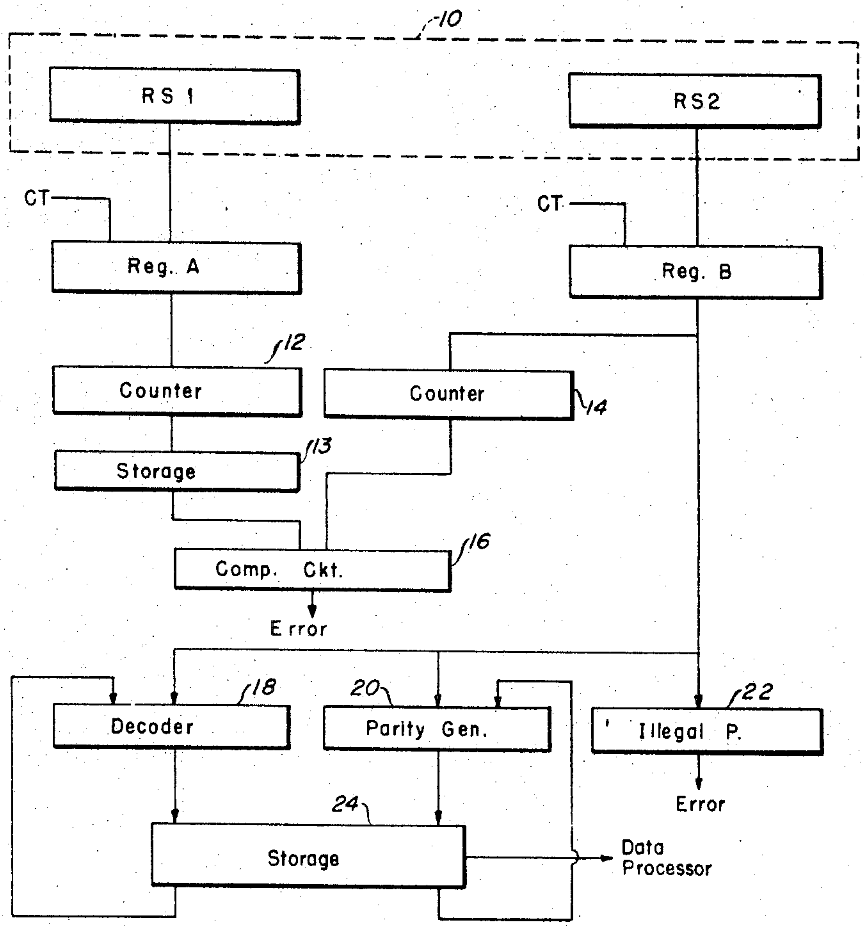
FIGURE 1 is a diagrammatic representation of the principal elements which constitute a portion of the hardware used in implementing the invention.

Referring first to FIGURE 1, the numeral 10 identifies a document reader which incorporates a pair of reading stations RS1 and RS2. For purposes of describing the present invention, it is assumed that the documents to be read are cards having holes punched therein in accordance with the Hollerith code configuration and that the reading stations take the form of means for sensing the presence of the holes in the document. A typical form of hole-reading means is an electro-mechanical brush circuit which is adapted to establish an electrical circuit when the brush projects through any hole in a document being read to a contact on the other side of the document.

The document being fed is considered in the present invention to be fed on a broad-side basis with the first row sensed being the 9 row in the Hollerwith configuration. As the document is fed through the first reading station RS1, the data read from the document is appropriately loaded into a register Reg. A under the control of suitable timing pulses CT derived from a cycle timer or clock, not shown. A hole counter 12 is connected to the output of the register A and provides a digital indication of the number of holes sensed at the reading station RS1 as the document is passing therethrough. The number in the counter 12 will then be stored in a storage register 13.

After the document has been read at the reading station RS1, it is passed along through the reader to the reading station RS2. The holes in the document will be once again read and transferred into the register Reg. B under the control of suitable timing pulses CT. A further counter 14 is connected to the output of the register Reg. B and this counter also produces a digital indication of the number of holes sensed at the reading station RS2. The output of the counter 12 as stored in the register 13 is then compared with the output of the counter 14 in a comparison circuit 16 which will produce an output error signal in the event that there is a difference detected in the number of holes sensed at the reading station RS1 and the station RS2.

The output of the register Reg. B is also applied to a decoder circuit 18, a parity generator 20, and an illegal punch detection circuit 22. The decoder 18 serves to convert the incoming Hollerith identifications to a suitable binary code which is stored in a storage means 24 in a manner to be described more fully hereinafter. The parity generator 20 serves to produce a parity bit with each code conversion and appropriately relates this with data previously associated with the particular conversion being carried out as such data may have been stored within the storage means 24. The illegal punch circuitry 22 may be used to appropriately register the presence of any combinations of signals from the reading station which represent a code combination not acceptable to a particular data processing problem. In the event that an illegal punch combination is detected, an error signal will be produced and the signal may be appropriately utilized by the associated system or by the operator.

For purposes of explaining the present invention, it is assumed that the document read has 80 columns. Thus, referring to FIGURE 2, the reading station RS2 is assumed to have 80 brush-reading circuits B1 through B80, each of which is associated with an individual column on the document being read. The document here is identified by the numeral 26. The brush-reading circuits B1 through B80 at the reading station RS2 are broken up into five separate groups of reading circuits, each of which has 16 brush-reading circuits associated therewith. Thus, the brush-reading circuits B1 through B16 are applied to a gating circuit indicated generally at G1. Similarly, the brush-reading circuits B17 through B32 are applied to a gating circuit G2, the brush-reading circuits B33 through B48 are applied to a gating circuit G3, the brush-reading circuits B49 through B64 are applied to the gating circuit G4, and the brush-reading circuits B65 through B80 are applied to a gating circuit G5. The output from the gating circuits G1 through G5 are arranged to be selectively gated into the register Reg. B which is a 16-bit register and adapted to receive, at any one instant, signals representing the identifications that may have been sensed at any particular row of data on the card 26 as it passes through the reading station RS2. Thus, as a particular row of identifications is passing through reading station RS2, 16 columns are examined substantially simultaneously and after the first 16 columns are sensed, the next 16 columns will be sensed. This continues until all 80 columns have been sensed. All of the scanning of the 80 brush-reading circuits is effected while the card 26 is in motion past the reading station RS2. Thus, a complete cycling is effected in all 80 columns as each row of data passes through the brush-reading circuits at the reading station.

Figure 3:
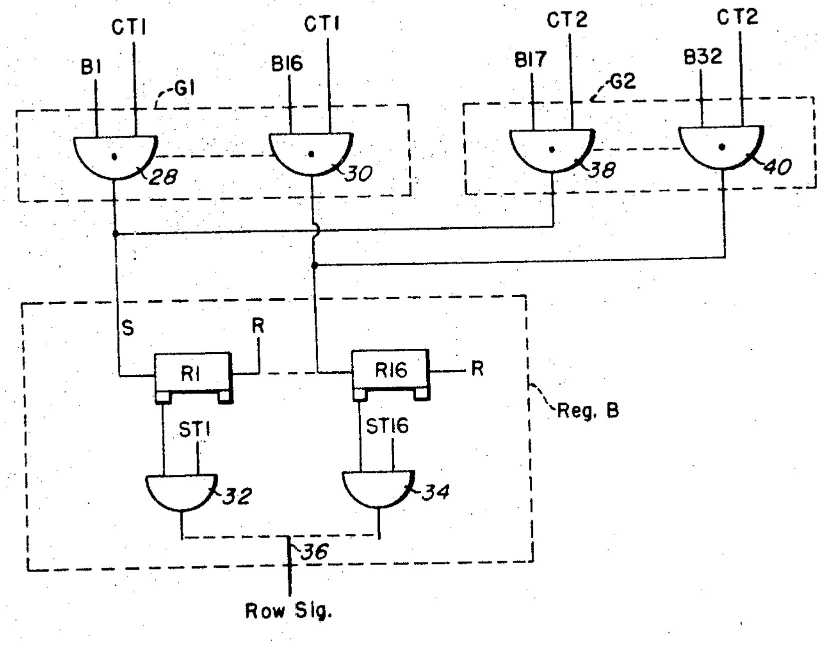
FIGURE 3 represents diagrammatically the circuitry associated with the setting of the input registers of the invention.

FIGURE 3 shows in greater detail the arrangement of the brush-reading circuits and the timing signals relative to the register Reg. B. The gating circuit G1 is arranged to include a series of "and" gates with each "and" gate being associated with a separate brush circuit. Thus, the brush circuit B1 is associated with an "and" gate 28. The gate 28 also has an input from a timing signal CT1. In the event that there is a hole sensed by the brush circuit B1 at the time that the cycle timer signal CT1 appears, a signal will be passed through the gate 28 into an associated flip-flop in the register Reg. B. The flip-flop R1 would thus be set indicating that a hole was sensed at the corresponding location in the document being read. In a similar manner, a gate 30 is provided for the brush line B16. The output of this gating circuit is connected to a further register flip-flop R16 and this flip-flop should also be set in the event that a hole is sensed in the corresponding location in the document being read.

Once the data representing the first 16 brushes has been read into the register flip-flops R1 through R16 in the register Reg. B, the data may then be read out from the register flip-flops R1 through R16 in a sequential manner to be available for the encoding process. The readout from the register is controlled by a series of gates with one each being associated with each of the flip-flops R1 through R16. Thus, an "and" gate 32 is shown connected to the output of the flip-flop R1 and a further "and" gate 34 is shown next to the output of the flip-flop R16. The sequential timing signals ST1 through ST16 are used for sequentially activating the gates associated with each of the register flip-flops so that a sequential readout of each flip-flop may be effected on the output line 36.

Figure 2:
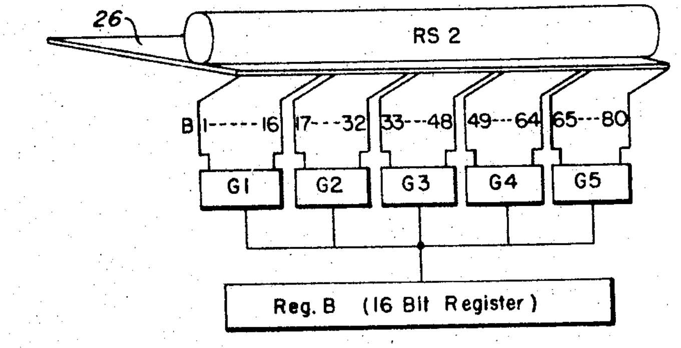
FIGURE 2 is a diagrammatic representation of a document-reading portion of the apparatus.

Once the data from the first 16 brushes has been read into the associated register flip-flops, the register flip-flops will be reset in preparation for the reading of the next 16 brushes. This reading will be controlled by way of the further gating circuit G2 including therein a series of 16 gates to be associated with the brush circuits B17 through B32. This is diagrammatically illustrated in FIGURE 3 by way of the "and" gating circuits 38 and 40 which are adapted to be activated at cycle time CT2. It will be apparent that each of the additional gating circuits G3 through G5, as illustrated in FIGURE 2, may be implemented in the manner illustrated in FIGURE 3 for appropriately gating the brush-reading circuit signals into the register Reg. B at the appropriate time so that a sequential reading of Reg. B may be effected with respect to each brush circuit of the combination.

Figure 4:
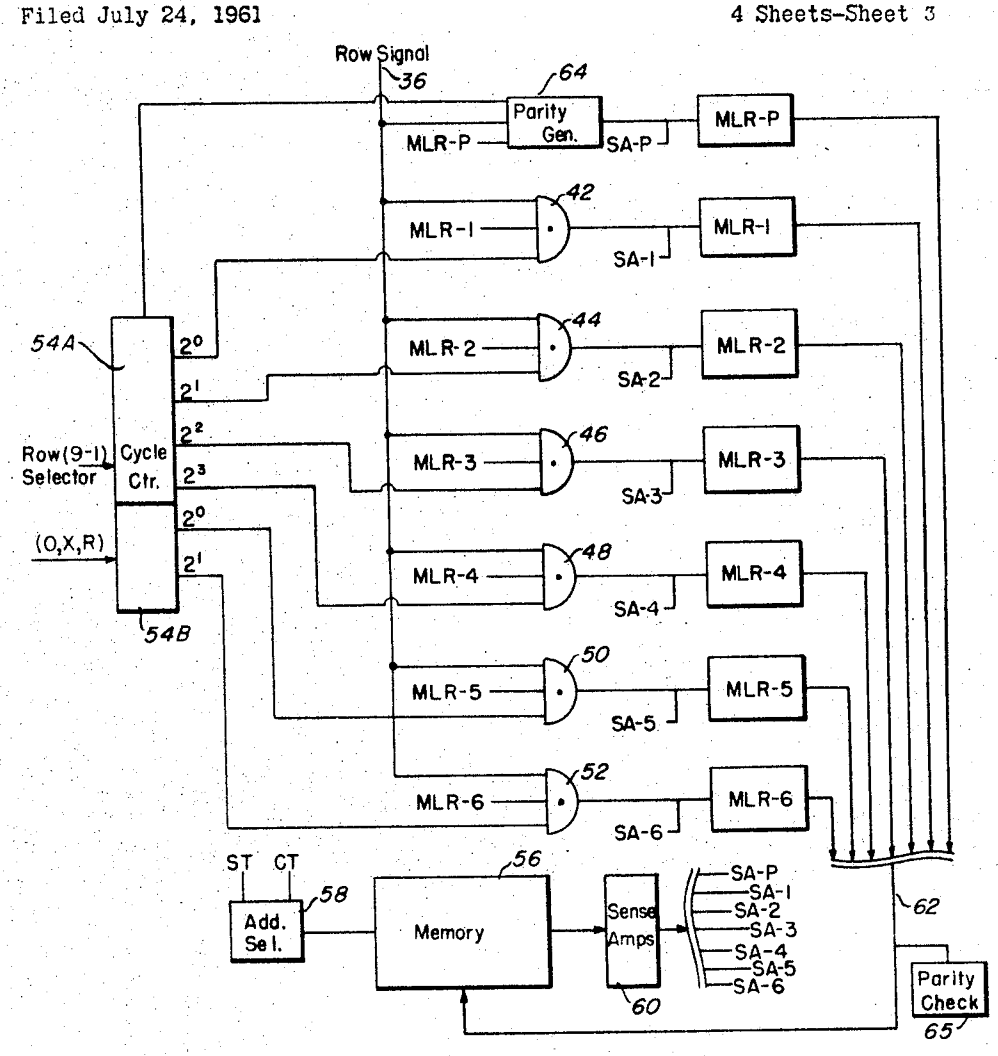
FIGURE 4 is a diagrammatic representation of the logical circuity utilized in the conversion process.

Each individual row signal appearing in the output line 36 in FIGURE 3 is arranged to be applied to a series of encoding gating circuits in FIGURE 4. These gating circuits are identified as gating circuits 42, 44, 46, 48, 50 and 52. Each of the subject gating circuits has three input gate legs, one of which is common to the input row signal line 36. A further input to each of the gating circuits is an output signal from a cycle counter having two sections 54A and 54B. The section 54A is a counter having a four-bit binary-type output which is adapted to be stepped each time a different one of the rows 9 through 1 is being read at the reading station.

The section 54B is a counter having a two-bit binary-type output which is adapted to be stepped in accordance with the presence of the rows 0, X and R. Thus, the cycle counter section 54A may be arranged to have on the output thereof a binary coded 9 when the 9 row is being read from the document passing through the reading station. Similarly, the cycle counter section 54B may have an output representing a binary 3 when the row 0 is being read, as will be discussed below in connection with Table 1.

A further set of signals for the gates 42 through 52 is derived from a series of register circuits identified as the memory local register circuits MLR–1 through MLR–6. The memory local register circuits MLR–1 through MLR–6 may well take the form of a series of flip-flops adapted to be used in the capacity of a memory local register for a suitable memory circuit 56 and which may be considered as a part of the storage circuit 24 in FIGURE 1. The memory circuit 56 may well take the form of an addressable coincident current memory having an appropriate address selector 58 connected thereto. The memory is assumed to be a three dimensional memory array having at least seven memory planes with each input address defining a single storage location in each of the seven planes of the array. The actual address selected by way of an address selector 58 will be in accordance with the particular combination of timing signals active in the circuit at any one instant with the timing signals being the sequence timing signals ST and the cycle timing signals CT. For purposes of the operation to be implemented in the described embodiment, the number of addresses required for an 80-column card or input document is 80, with each address defining an address location in the memory 56 which is uniquely associated with a particular column in the document being read. The output of the memory 56, once it has been appropriately addressed by the selection circuit 58, is by way of a series of sense amplifiers 60 which are adapted to activate the sense amplifier lines SA–1 through SA–6 and SA–P. The sense amplifier lines SA are appropriately connected to the memory local register circuits MLR–1 through MLR–6 and MLR–P. The outputs of the memory local register circuits are arranged to be appropriately coupled back to the memory 56 by way of the coupling lines indicated generally at 62.

Also associated with the gating circuits 42 through 52 and the incoming information represented by the row signal on the line 36, is a parity generator 64. This parity generator 64 serves to produce a parity bit which is to be associated with the binary coded characters which are encoded by the present apparatus. The details of the parity generator are more specifically discussed below in connection with FIGURE 6.

Figure 5:
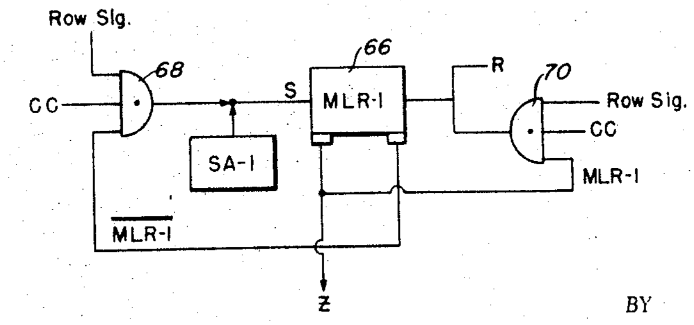
FIGURE 5 is a diagrammatic representation of the circuitry connected to the memory local register circuits.

FIGURE 5 illustrates the basic logic of each of the memory local register stages MLR. The memory local register, in each stage, comprises a flip-flop 66 having a set input and a reset input. Connected to the set input is a sense amplifier related to the particular level of the binary code associated with the particular flip-flop. Thus, if the memory local register stage is MLR–1, the sense amplifier will be SA–1. Also associated with the set side of the flip-flop 66 is an "and" gate 68 having as its input the row signal, the cycle counter signal CC, and a signal representing the previous history from the flip-flop 66, namely $\overline{\text{MLR–1}}$.

The reset input to the flip-flop 66 may be by way of the reset signal R which is adapted to be active after each character-encoding operation to thereby clear the register. Also connected to the reset input of the flip-flop 66 is an "and" gate 70 having connected to the gate leg thereof the row signal input, the cycle counter input, and a signal representing the previous history in the memory local register, namely MLR–1.

Figure 6:
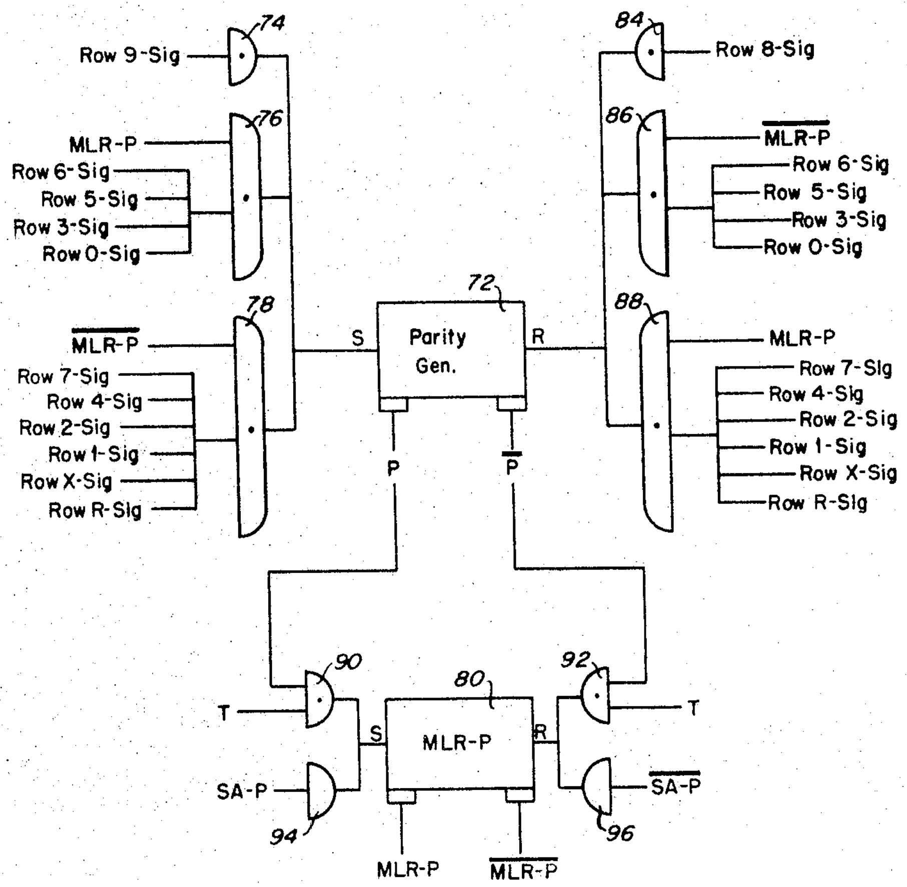
FIGURE 6 illustrates apparatus for producing a checking pulse or digit which may be carried with the information as it is converted.

A representative form of parity generator is illustrated in FIGURE 6. In this figure, there is provided a parity generator flip-flop 72 having a set input and a reset input. Connected to the set side of the flip-flop 72 are three "and" gates 74, 76 and 78. The input to the gate 74 is a signal representing that row 9 of the input document is being sensed. Thus, at row 9, the parity generator 72 will be unconditionally switched to the set state.

The gate 76 has a parity input representing the previous parity condition as indicated by the status of the memory local register parity bit flip-flop 80. In addition, the gate 76 has buffered to a further gate leg signals representing the presence of a hole in any of the rows 6, 5, 3 and 0.

The gate 78 has a pair of input gate legs, the first of which is derived from the memory local register flip-flop 80 and the other is derived from a series of row signals representing the rows 7, 4, 2, 1, X and R.

Connected to the reset side of the parity generator 72 are an additional set of input "and" gates 84, 86 and 88. The gate 84 is used for gating the presence of a row signal at row 8 to reset the generator 72. The gate 84 is provided with a pair of input gate legs, the first of which represents a previous history as indicated by the parity bit stored in the memory local register flip-flop 80 and the other represents a series of input buffer signals indicating the presence of signals in each of rows 6, 5, 3 and 0. The "and" gate 88 also has a pair of input gate legs, the first of which is the stored parity bit in the memory local register flip-flop 80 and the second of which represents the buffered signals for identifications sensed in rows 7, 4, 2, 1, X and R.

Once the parity generator 72 has been set or reset, the condition thereof will be appropriately gated into the memory local register flip-flop 80 by way of a pair of gating circuits 90 and 92. Also associated with the input to the register flip-flop 80 is a set gate 94 connected to the parity sense amplifier output SA–P and a reset gate 96 connected to the parity sense amplifier output $\overline{\text{SA–P}}$.

As pointed out above, the incoming data on the documents passing through the reading stations of the present combination are assumed to be arranged with the Hollerith code superimposed thereon either in the form of holes or other data identifications. Each column may or may not contain identifications to uniquely identifiy the particular number or character to be represented at a particular location on the document. In one embodiment of the invention, the binary code to be associated with the different row positions in each column were selected to correspond to the following table:

*Table 1*

| Document row identification: | Binary code |
|---|---|
| 9 | 001001 |
| 8 | 001000 |
| 7 | 000111 |
| 6 | 000110 |
| 5 | 000101 |
| 4 | 000100 |
| 3 | 000011 |
| 2 | 000010 |
| 1 | 000001 |
| 0 | 110000 |
| X | 100000 |
| R | 010000 |

From the foregoing table, it will be noted that in the event a numeric output is desired, the presence of an identification mark or hole at any of the row identification positions will define the presence of a number and this number then is in turn to be interpreted in accordance with the binary equivalent of that number. In addition, if alpha-numeric information is desired, certain combinations of the numeric identifications as well as one of the symbols 0, X or R, in combination, will define an appropriate alpha-numeric character. Thus, the presence of an R identification and a 1 identification may identify the character A, while the presence of an R identification and a 2 identification may identify a character B.

It will be apparent that the combinations of the numerics and the 0, X and R indicators can serve to identify a large number of alpha-numeric characters. As this combination will obviously permit a total number of combinations in excess of the normally desired number of codes, by definition, any code other than one falling within a certain pre-established criteria may be identified or referred to as an illegal code. What is considered legal and illegal in the resultant code will be dependent, of course, upon the particular system utilizing the information produced by the encoding apparatus in the present invention. Further, when a document is being read, the coded output may be varied in accordance with whether any carry propagation is allowed in the summing operations performed in the encoding operations.

Considering next the over-all operation of the apparatus, this operation may best be understood by reference to the reading of a particular document. A document is assumed herein to be a punched-card document such as illustrated at 26 in FIGURE 2. As the document is fed into the card-reading apparatus 10, in FIGURE 1, it will first pass the reading station RS1 where all of the holes in the card will be read by way of appropriate brush circuits and the reading will be effected by way of the register Reg. A on a time-shared basis in the manner illustrated in FIGURES 2 and 3. The reading of the data into the register Reg. A will be utilized for purposes of establishing a count of the total number of holes that have been punched in the document as actually read at the reading station RS1. The resultant count produced in the counter 12 will be stored in the storage circuit 13 to await the arrival of a similar count to be produced as the same document is passed through the reading station RS2. For purposes of verifying the reading operation, the passage of the document through RS2 will cause the data shifted into the register Reg. B to be read out into the counter 14. At the completion of the reading operation in the second reading station RS2, the numerical count of the counter 14 should correspond to that count which is then stored in the storage circuit 13. If there is an identity in the number of holes read at the two reading stations, the comparison circuit 16 will not produce an output signal indicating that any error has occurred.

As the data is being read in the reading station RS2, the decoder 18 will be functioning to produce an appropriate binary code on the output thereof which may be appropriately inserted into the storage circuit 24 at a location which uniquely identifies the data in each of the columns of the document being read at the reading station. At the same time, a parity bit will be added to this information by way of the parity generator 20. Illegal code combinations in any particular column will be sensed by way of the illegal punch detection circuits 22.

As the document 26 first reaches the reading station RS2, as illustrated in FIGURE 2, the row 9 of the document will be in the poistion first under the reading brushes B1 through B80. By way of the cycle timing pulses CT1, the first 16 columns will be analyzed by having their data read, at any location wherein a hole is punched, into an associated register flip-flop R1 through R16 within the register Reg. B, as shown in FIGURE 3. Once the data from the first 16 columns resides in the flip-flops of the register Reg. B, a sequential scanning takes place to sense the presence of a set condition in each of the individual register flip-flops R1 through R16. The sequential reading of each individual register flip-flop will be by way of the gating circuits having the sequence timing pulses ST1 through ST16 connected to the input thereof. Thus, when row 9 is present, the first column having a punch in the 9 position will be sensed and will produce a row signal on the output line 36 by way of the associated input gate at a time that corresponds to the sequence timing signals ST which control the readout from the register Reg. B.

Inasmuch as it is assumed that the first row present at the reading station is the row 9, the cycle counter 54, shown on FIGURE 4, will have on the output thereof a binary code representing the numeral 9 in binary code. This code would be as represented above in Table 1. Thus, with the row signal present on the line 36, and with the cycle counter output lines $2^0$ and $2^3$ being active on each of the gates 42 and 48 respectively, a signal will be gated into the associated memory local register positions MLR–1 and MLR–4. If the memory local register flip-flops are assumed to be in the reset state at the start of the readout cycle, the presence of a row signal, as illustrated in FIGURE 5, and a cycle counter signal with memory local register being reset, the gate 68 will open and a set signal will be applied to the memory local register flip-flop 66. The logic associated with the memory local register flip-flop MLR–4 may correspond to that of FIGURE 5, and this flip-flop will be set.

By way of the parity generator 72, as shown in FIGURE 6, the presence of row 9 at the reading station will automatically cause the parity generator 72 to be set. The presence or absence of a row signal in row 9 is of no consequence since the parity bit representation is the same whether or not a row signal is present. Thus, the parity generator 72 will be switched to the set state and this set condition will be appropriately gated into the memory local register flip-flop 80.

With the data and the parity information having appropriately been set into the memory local register flip-flops, as shown in FIGURE 4, these flip-flops will be read out by way of their output coupling lines 62 into the memory 56 at an address location which will be uniquely defined by the address selector 58 and relate directly to the particular column wherein the data was derived. This will be defined by the sequence timing signals and the cycle timing signals ST and CT respectively.

The aforedescribed cycling process will take place with each individual column of the incoming document being read for row 9. After row 9 has been read, the card will continue in movement until such time as the brushes reside in row 8. At this point, the row selector will provide a signal to the cycle counter 54 and the output of the cycle counter will now take the form of a binary code to represent the numeral 8 as shown above in Table 1. In the event that a signal identifying the presence of a hole in any particular column in row 8 is sensed in the course of the next scanning, the appropriate binary code will be inserted into the memory local register circuits as described above for insertion into the address location related to the particular column being read into the memory 56.

It will be apparent from an analysis of the apparatus illustrated particularly in FIGURE 5 that in the event a signal has been previously stored in an address location in the memory for a particular column, the presence of a new incoming signal will be added modulo 2, without carry, in the memory local register circuits. Thus, a super-position process takes place within the memory local register whereby it is possible to effect a continuous conversion of the data coming in from the input document and to update any conversion previously made in the event that a subsequent code is received indicating that the code for a particular column needs modification before it is finally utilized. It thus becomes possible to superimpose a 9 and an R, for example, to form a particular character as well as an 8 and 3 to identify a particular symbol. Further, in certain direct transcription modes of operation, it is possible to superimpose numerical codes of several of the numerical identifications 1 through 9 as shown in Table 1, with the limitations being governed only by what the associated equipment may define as legal and illegal output code combinations.

Insofar as each particular memory local register stage is concerned, it will be apparent that the previous history from a particular memory location will be applied to the memory local register by way of the sense amplifier and will set the memory local register in the event that a "one" had previously been stored in that particular location. In the event that a row signal is present at that particular instant on the input of the gate 70, and the cycle counter CC has its associated output line for that particular level active, the gate 70 will be opened and the reset signal will be applied to the memory local register stage to provide the modulo 2 adding operation. At the same time that this operation is going on, the parity generator 72 for the particular row being sensed will either be switched to the set or the reset state in accordance with the previous history of the character parity as may have been set into the memory local register MLR–P. The resultant parity bit is then gated into the memory local register so that it may then be inserted into the appropriate address location related to the operation being performed. This arrangement assures that the parity bit related to a particular conversion will always be on an updated basis and that the arrangement will not be self-correcting in the event that a parity error should occur.

Once the document has completely passed through the reading station RS2, all of the data which was present in the document should have been appropriately encoded and inserted into memory locations corresponding to the columns within the document. At this point, a readout operation may take place so that each of the memory locations is appropriately addressed and read out to an associated data processor.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure by Letters Patent is:

1. Apparatus for converting data encoded in Hollerith code into a binary code comprising an addressable memory means having a separate storage location for each Hollerith code combination to be converted, a memory local register connected to said memory, said memory local register being adapted to receive and send binary encoded data relative to selectively addressed memory locations in said memory means, means addressing said memory means concurrently with the appearance of a Hollerith code-identifying signal, a cyclically operative counter having an output indicative of the binary code of each Hollerith code-identifying signal and gating means having connected to the input thereof said Hollerith code-identifying signal, said counter and the output of the memory local register, said gating means being connected to said memory local register to effect an addition of the data passed through said gating means with the data residing in said memory local register.

2. Apparatus for converting data encoded in a first-type code into a second-type code comprising an addressable memory means having a separate storage location for each input-type code combination to be converted, a memory local register connected to said memory, said memory local register being adapted to receive and send data in said second type relative to selected memory locations in said memory means, means addressing said memory means concurrently with the appearance of each first-type code input, a cyclically operative counter having an output indicative of said second-type code, gating means having connected to the input thereof a signal indicative of said first-type code said counter and the output of the memory local register, said gating means being connected to said memory local register to effect an addition of the data passed through said gating means with the data residing in said memory local register.

3. Apparatus for converting data from a Hollerith card having a plurality of data storage identifications arranged in rows and columns into a binary code, means sequentially sensing the column identifications in each row, a row identification counter adapted to have a binary output characteristically identifying each row, an addressable memory having a plurality of digital storage locations equal in number to at least the number of columns in said card and each of which is adapted to store all the data represented in each column, gating means, said gating means having said counter and said sensing means connected to the input thereof to sequentially activate said gating means whenever an identification is sensed, and means directly connecting the output of said gating means to said memory to transfer a binary coded output from said counter and data from said addressable memory into an address location corresponding to the column having one of said identifications therein.

4. Apparatus for converting data encoded in a plurality of columns and rows in the form of a Hollerith code into a binary code comprising an addressable memory means having a separate storage location for each Hollerith code combination to be converted, a memory local register connected to said memory, said memory local register being adapted to receive and send binary encoded data relative to selected memory locations in said memory means, means addressing said memory means concurrently with the appearance of a Hollerith code-identifying signal, a cyclically operative counter adapted to be stepped with each row of input data and having an output indicative of the binary code representative of each said row, gating means having connected to the input thereof said Hollerith code-identifying signal said counter and the output of the memory local register, and means connecting said gating means to said memory local register to effect an addition of the data passed through said gating means with the data residing in said memory local register.

5. Apparatus as defined in claim 4 wherein said memory local register has said gating means connected to add modulo 2, without carry, between the stages thereof.

6. Apparatus for converting data from a Hollerith card having a plurality of data storage identifications arranged in rows and columns into a binary code, means sequentially sensing the column identifications in each row, a row identification counter adapted to have a binary output characteristically identifying each row, an addressable memory having a plurality of digital storage locations equal in number to at least the number of columns in said card, gating means, said gating means having said counter said memory means and said sensing means connected to the input thereof the latter of which is adapted to sequentially activate said gating means whenever an identification is sensed, means connecting the output of said gating means to said memory to transfer a digital output from said counter and data from the addressed memory into an address location corresponding to the column having one of said identifications therein, a parity bit generator connected to said memory to provide a parity bit for each storage location, said parity bit generator having an input indicative of each column identification sensed and the parity bit stored in each selected memory location.

7. Apparatus for converting data from a Hollerith card having a plurality of data storage identifications arranged in rows and columns, means sequentially sensing the column identifications in each row, a row identification counter adapted to have a binary output characteristically identifying each row, an addressable memory having a plurality of digital storage locations equal in number to at least the number of columns in said card, each of said digital storage locations being adapted to store all the data represented in each column, gating means, said gating means having said counter the digital contents of a selected storage location and said sensing means connected to the input thereof to sequentially activate said gating means whenever an identification is sensed, and means connecting the output of said gating means to said memory to transfer the output from said gating means and data from said addressable memory into an address location corresponding to the column having one of said identifications therein.

References Cited by the Examiner

UNITED STATES PATENTS

| | | | |
|---|---|---|---|
| 3,000,556 | 9/1961 | Bewley et al. | 235—61.6 |
| 3,012,230 | 12/1961 | Galas et al. | 340—172.5 |
| 3,083,903 | 4/1963 | Larson | 235—61.6 |
| 3,130,386 | 4/1964 | Barbagallo | 340—146.1 |

ROBERT C. BAILEY, *Primary Examiner.*

WALTER W. BURNS, Jr., MALCOLM A. MORRISON, *Examiners*